United States Patent [19]
Schroeder

[11] 3,784,743
[45] Jan. 8, 1974

[54] PARALLEL DATA SCRAMBLER

[75] Inventor: Henry Charles Schroeder, East Brunswick, N.J.

[73] Assignee: Bell Telephone Laboratories, Incorporated, Murray Hill, N.J.

[22] Filed: Aug. 23, 1972

[21] Appl. No.: 283,159

[52] U.S. Cl. .............................................. 178/22
[51] Int. Cl. .............................................. H04l 9/02
[58] Field of Search .................. 178/22; 179/1.5 R, 179/1.5 C

[56] References Cited
UNITED STATES PATENTS 3,711,645 1/1973 Ehrat .................................. 178/22

*Primary Examiner*—Maynard R. Wilbur
*Assistant Examiner*—H. A. Birmiel
*Attorney*—J. P. Kearns

[57] ABSTRACT

Parallel streams of synchronous binary digital data are scrambled and descrambled with the aid of single complementary pseudorandom key signal generators at the respective transmitting and receiving terminals of a data transmission system. The key signal constructed from a selected one of the parallel streams is applied to the remaining streams after predetermined differential delays. Where the key signal is generated in a multistage binary shift register, the required differentially delayed signals are readily obtained from different stages thereof.

10 Claims, 2 Drawing Figures

PATENTED JAN 8 1974 3,784,743

SHEET 1 OF 2

PARALLEL DATA SCRAMBLER

FIELD OF THE INVENTION

This invention relates to the randomization of continuous digital data signal patterns in electrical communications systems.

BACKGROUND OF THE INVENTION

A scrambler is a digital machine which remaps data sequences having either long periods without transitions, e.g., all-one's or all-zero's, or repetitive patterns of relatively short duration, e.g., alternate one's and zero's, into substantially aperiodic channel sequences. Data scramblers have utility both in reducing the level of isolated tones generated when short-period repetitive data sequences are modulated up to the passband of band-limited transmission channels and in assuring the presence of sufficient transitions to maintain synchronism between transmitting and receiving terminals.

The basic data scrambler — and its complementary matching descrambler — was disclosed in the patent application of R. D. Fracassi and T. Tammaru, Ser. No. 482,498, filed Aug. 25, 1965, and also in U. S. Pat. No. 3,515,805 issued to R. D. Fracassi and J. E. Savage on June 2, 1970.

These prior-art scramblers operate on serial binary data streams only. Of increasing importance today are multilevel and multiphase data transmission systems. These systems employ parallel data streams at baseband, i.e., before modulation, levels. Parallel data streams can also be developed from independent sources. It is preferable that each of these parallel streams is maintained as a substantially random sequence of symbols in order to achieve reliable operation at high transmission speeds.

It is an object of this invention to provide an economical digital data scrambler-descrambler arrangement for data transmission systems employing parallel data streams.

It is another object of this invention to provide a single data scrambler-descrambler arrangement which is adaptable without alteration to randomize a range of parallel synchronous data streams.

SUMMARY OF THE INVENTION

According to this invention, parallel streams of synchronous digital data are randomized at a transmitting terminal of a data transmission system by combining each stream with different phases of a pseudorandom key signal derived from a single one of such streams.

The several scrambled data streams are descrambled in a self-synchronous manner by complementary apparatus which regenerates the key signal at a receiving terminal from the data stream from which it was derived and subtracts it from each of the several parallel streams in appropriate relative phase. Apparatus for generating the key signal at both transmitting and receiving terminals advantageously comprises a multitap delay unit with feedback connections from at least two taps thereof to the input to which one of the parallel streams being randomized is also applied. The feedback information and the input stream are combined modulo-two fashion in a device such as an exclusive-OR gate to form either the scrambled channel output at the transmitting terminal or the descrambled and restored data stream at the receiving terminal. For binary data the effect of a multitap delay unit is readily obtained with a shift register advanced at the synchronous data rate.

Inasmuch as the key signal recirculates in its delay unit or shift register with only one of the parallel data streams, only that stream is subject to producing error multiplication, i.e., any error entering the shift register is fed back to the input the number of times there are feedback paths. Any single error occurring in any other parallel stream remains a single error.

It is a feature of this invention that a plurality of simple shift registers with matching feedback connections can be joined in tandem to double the length of the pseudorandom sequence for each shift register added after the first one. This feature permits bypassing all additional shift registers during start-up for fast synchronization and yet makes available a relatively long sequence during actual data transmission.

It is another feature of this invention that only one master channel sequence need be derived regardless of the number of parallel data streams being scrambled (within the limit of the number of stages in the key-signal generator). Additional data streams are randomized by different phases of the master channel sequence.

BRIEF DESCRIPTION OF THE DRAWING

The above and other objects and features of this invention will become apparent from consideration of the following detailed description and the drawing in which.

DETAILED DESCRIPTION

Known data scramblers operate solely on serial data streams. In newer data transmission systems in which higher speeds are attained from multilevel, as distinguished from binary, encoding the original serial data stream is converted into parallel form prior to modulation. Application of scrambling to the data system in accordance with conventional principles would require either a large capacity (in terms of length of the pseudorandom key signal) serial scrambler for the basic binary data stream or an independent serial scrambler for each parallel data stream.

Multiphase data modulation systems are described in Chapter 10 of *Data Transmission* by W. R. Bennett and J. R. Davey (McGraw-Hill Book Company 1965). Four-phase (FIG. 10–1, page 202) signals requiring two parallel bit streams and eight-phase (FIG. 10–2, page 202) signals requiring three parallel bit streams are advantageously randomized according to this invention. For purposes of description the presence of three parallel data streams is assumed.

Figure 1:
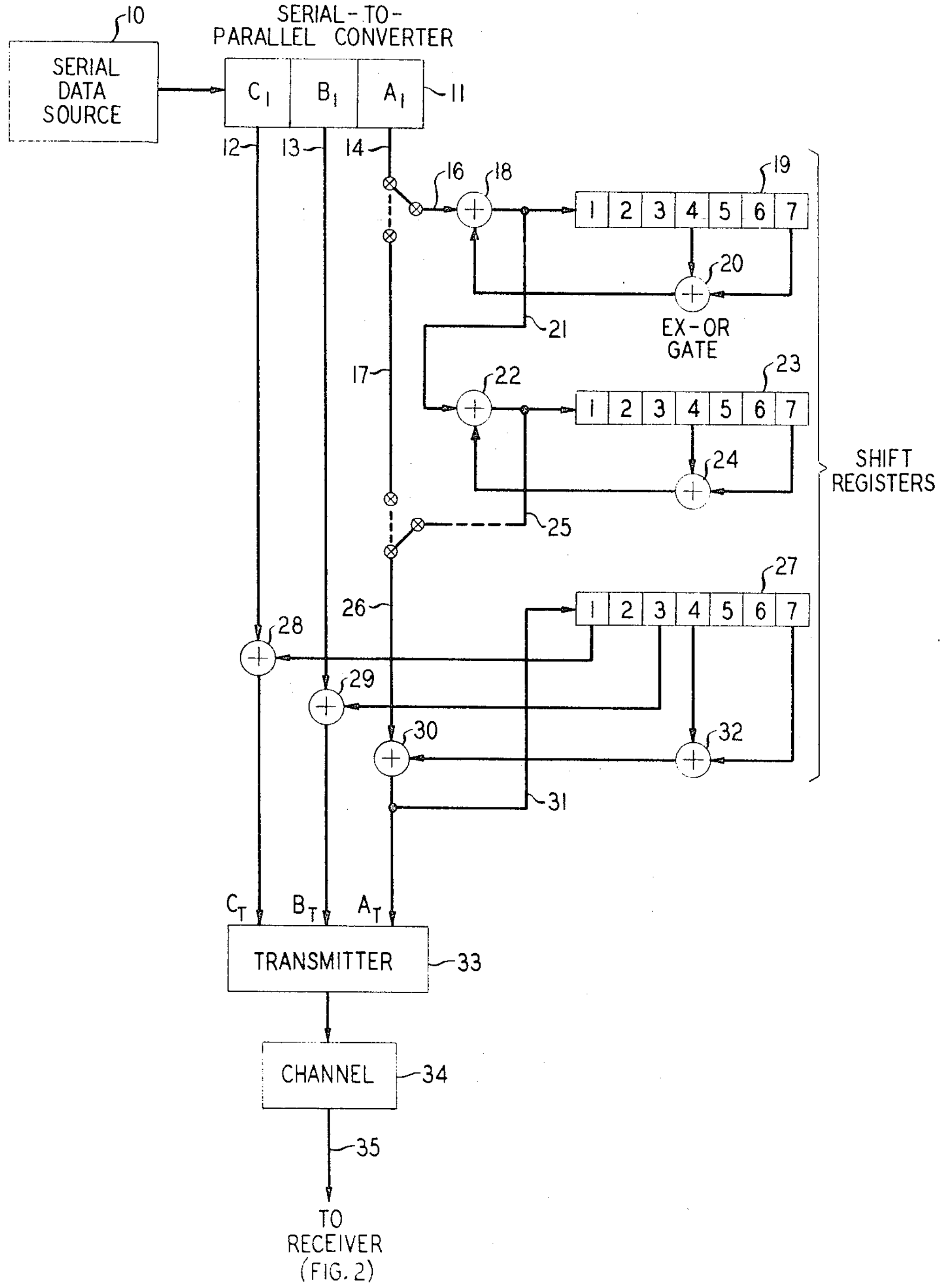
FIG. 1 is a block schematic diagram of a transmitting terminal for a data transmission system including a parallel data scrambler according to this invention.
Figure 2:
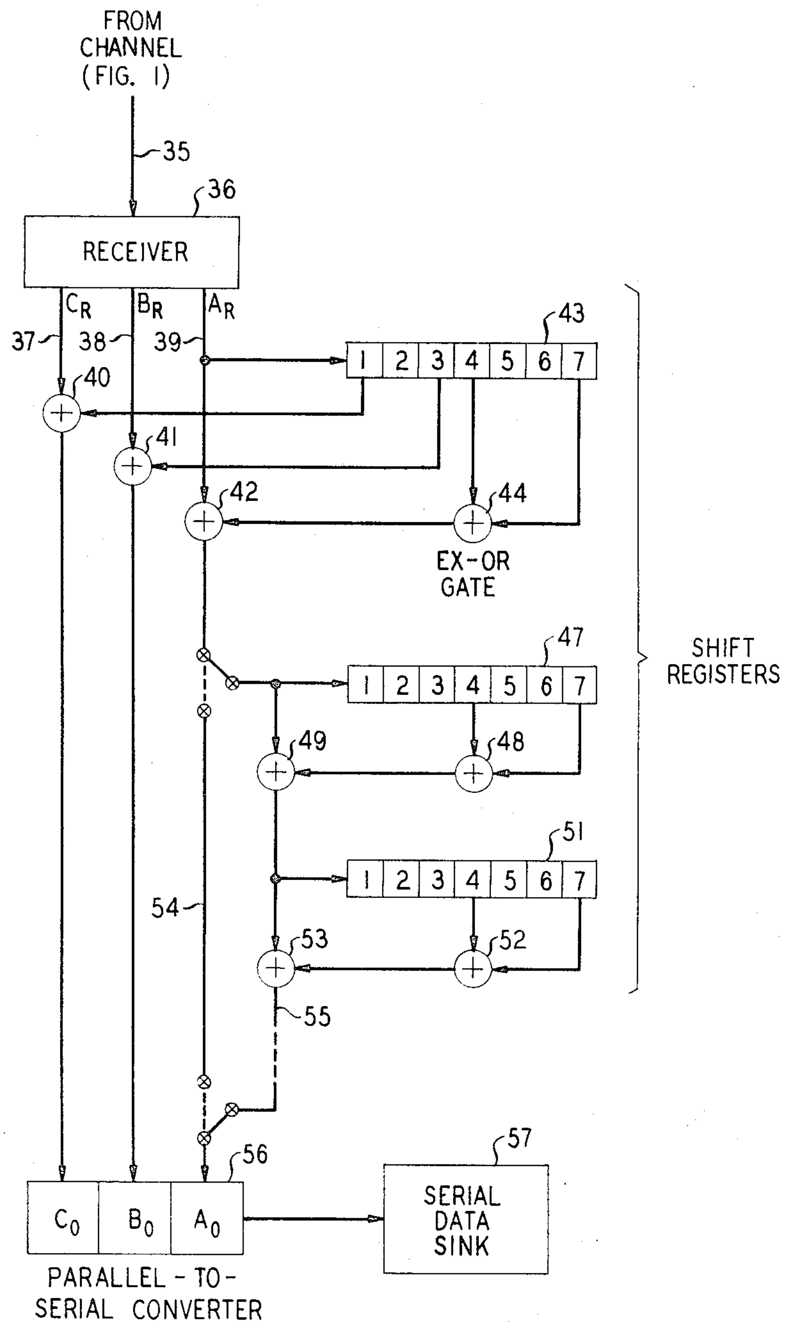
FIG. 2 is a block schematic diagram of a receiving terminal for a data transmission system including a parallel data descrambler according to this invention.

FIGS. 1 and 2 taken together illustrate a scrambler-descrambler arrangement for a data transmission system requiring the presence of three parallel data bit streams prior to and following the modulation process.

FIG. 1 depicts the transmitting terminal of a data transmission system employing eight-phase modulation and including a parallel scrambler according to this invention. The transmitting terminal comprises serial data source 10; serial-to-parallel converter 11; a plurality of feedback shift registers 19, 23 and 27; phase-modulating transmitter 33 and channel 34. During one conversion period, three serial bits $A_1$, $B_1$ and $C_1$ are entered into serial-to-parallel converter 11. These three bits are then available in parallel on leads 14, 13 and 12, respectively, to be propagated therealong to transmitter 33 for simultaneous encoding as a particular phase change, for example. To implement the scrambling function, exclusive-OR gates (whose outputs are of one binary sense for like inputs and of opposite binary sense for unlike inputs) 28, 29 and 30 are placed in series with leads 12, 13 and 14. Further in series between leads 14 and 26 is located bypass link 17, which effectively removes shift registers 19 and 23 from the circuit.

The $A_1$ bit, preferably the most significant bit where the parallel bits are encoding a common parameter such as phase angle in a phase modulation data transmission system, is combined in exclusive-OR gate 30 with the key signal obtained from shift register 27. As is well known, a reentrant shift register with feedback from two or more stages to its input generates a pseudorandom binary signal train of length $2^n-1$, where $n$ is the number of stages. In the present example, seven-stage shift register 27 generates a 127-bit sequence repetitively. Outputs from the fourth and seventh stages are combined in exclusive-OR gate 32 and the resultant key signal is fed back through gate 30 to stage 1. The $A_1$ bit is also combined with the key signal in gate 30 to form the channel A bit on lead 31.

The $B_1$ and $C_1$ bits on leads 13 and 12 are randomized in exclusive-OR gates 29 and 28 from the outputs of stages 3 and 1, respectively, of shift register 27. Stages 1 and 3 convey the same pseudorandom signal as that on lead 31 but displaced in time by one and three time intervals. Thus, the B and C bit streams are randomized as well as the A bit stream. All three bit streams appear at the input for transmitter 33 as bit streams $A_T$, $B_T$ and $C_T$. Transmitter 33 prepares the incoming scrambled bit streams for application to the bassband of channel 34, which can be a telephone voice channel. Lead 35 indicates the far end of channel 34.

It has been found that a tandem connection of like key-signal generating shift register doubles the length of the basic pseudorandom sequence. Accordingly, further shift registers 19 and 23 shown in FIG. 1 can be placed in series between lead segments 14 and 26 by removing bypass link 17. Then the $A_1$ bit stream is first applied by way of lead 16 and exclusive-OR gate 18 to the input of shift register 19, which generates a 127-bit pseudorandom sequence by reason of the feedback of the outputs of stages 4 and 7 through exclusive-OR gate 20. The randomized sequence from the output of exclusive-OR gate 18 is further applied by way of lead 21 through exclusive-OR gate 22 to seven-stage shift register 23 which produces another 127-bit sequence. However, the input to gate 22 is already randomized and the output of shift register 23 on lead 25 is a 254-bit pseudorandom sequence. Output lead 25, which supplies an input to shift register 27 by way of gate 30, is shown in broken-line form to suggest that more shift registers can be added for even longer length pseudorandom sequences can be generated. In a practical system constructed according to the principles of this invention, four seven-stage shift registers have been used to obtain a 1016-bit pseudorandom sequence. An advantage of having a plurality of short shift registers rather than one long shift register is realized during start-up of a scrambler arrangement. All but one of the shift registers is bypassed, as suggested by bypass link 17 in FIG. 1 with switches closed to the dotted positions, so that the complementary shift register at the receiving terminal can be synchronized with a seven-bit sequence.

The effect of having a bypass link around the auxiliary shift registers can be obtained in the alternative by resetting all their stages to the one-state.

FIG. 2 depicts a receiving terminal including a descrambler according to this invention which is complementary to the parallel scrambler shown in FIG. 1. The receiving terminal comprises receiver 36, parallel-to-serial converter 56 and serial data sink 57. Receiver 36 demodulates the incoming channel signal on lead 35 from channel 34 into parallel baseband bit streams $A_R$, $B_R$ and $C_R$. In the absence of any descrambling apparatus these streams are converted into serial form in converter 56 and delivered to sink 57 for decoding.

If the channel signal incoming on lead 35 had been phase-modulated onto a single carrier wave, receiver 36 would advantageously constitute a digital phase demodulator of the type disclosed by H. C. Schroeder and J. R. Sheehan in copending patent application, Ser. No. 199,694, filed on Nov. 17, 1971. The digital demodulator there disclosed decodes phase shifts into binary numbers, the three most significant bits of which encode ±180°, ±90° and ±45° phase shifts in odd multiples of 22½°. Study of random data encoded in this way indicates that detected phase shifts must exceed 22½° to produce an erroneous decision. In the circumstance that three-bit groups encoding each phase change are Gray-coded, i.e., adjacent coded groups can differ in only one bit position, the A and B bits are each in error only 25° of the time and the C bit is in error 50° of the time. In the single register case the A bit circulates through the scrambling and descrambling shift register and, due to the feedback from two stages thereof (the fourth and seventh stages in the illustrative embodiment), three A bit errors result. An original A bit error also influences each of the B and C bits, but these errors are not multiplied. Thus, a single A bit error is expanded into five combined A, B and C bit errors. Following the above relative occurrence of A, B and C bits, five errors can happen 25° of the time and single errors, 75° of the time. The average of these is two possible errors per bit of scrambled data as against one error per bit of non-scrambled data.

It is further noted that where an even number of shift registers are used in each of the scrambler and descrambler, a degree of cancellation ensues and no further error in multiplication occurs. An odd number (other than one) of shift registers would entail additional error multiplication and should be avoided.

The descrambler in FIG. 2 comprises a principal shift register 43, which is directly complementary to shift register 27 in the scrambler of FIG. 1. Its input is taken directly from the $A_R$ bit stream on lead 39, just as the input of shift register 27 is connected directly to the $A_1$ bit stream on lead 31. Signals at the fourth and seventh stages are combined at exclusive-OR gate 44 to form the key signal again. Joint application of the regenerated key signal and the $A_R$ bit stream to exclusive-OR gate 42 results in the effective subtraction of the key signal from the $A_R$ bit stream. At the same time the signal traversing shift register 43 is tapped off at stages 1 and 3 to be subtracted in exclusive-OR gates 40 and 41 from the respective demodulated $C_R$ and $B_R$ bit streams.

The output of gate 42 is restored $A_0$ bit stream if only one tandem-connected shift register was used at the transmitting terminal. In this bypass lead 54 is in service after the indicated switches are thrown to the dotted positions. Otherwise the partially descrambled signal at the output of gate 42 is further descrambled in feedback shift registers 47 and 51, which are the counterparts of shift registers 19 and 23 in FIG. 1. Brokenline 55 suggests the use of additional shift registers to obtain longer pseudorandom patterns. The fourth and seventh stages of shift register 47 are connected to gate 48 to form the key signal and gate 48 is in turn connected to gate 49, which also has as an input the partially descrambled $A_R$ bit stream. Gates 52 and 53 are similarly arranged as shown with respect to shift register 51. In any event the number and arrangement of shift registers and exclusive-OR gates in the scrambler and descrambler must be exactly complementary in order for the overall system to be self-synchronizing.

For effective operation of the scrambler system, the input data is held in a continuous "one" state. All auxiliary shift registers (19 and 23 in FIG. 1 and 47 and 51 in FIG. 2) are reset to the "one" state for all stages. Auxiliary shift registers are thus effectively removed from the circuit. Three-bit all-one ABC groups are generated in converter 11 and scrambled by shift register 27 at the transmitting terminal of FIG. 1. At the receiving terminal of FIG. 2 after shift register 43 becomes filled with a seven-bit error-free sequence, the output consists entirely of one's. As soon as this condition is realized to indicate achievement of synchronism, the reset signal is removed from the auxiliary shift registers and these registers fill to complete the long-period key signal. The overall data transmission system is now in position to process message data.

While this invention has been described in terms of a specific illustrative embodiment, it will be recognized by those skilled in the art to be susceptible to a wide range of modifications within the scope of the appended claims.

What is claimed is:

1. A digital data randomizer for parallel streams of binary data comprising
   - means for generating a long-period pseudorandom key signal,
   - means for combining one of said parallel data streams with said key signal to form a first randomized channel signal, and
   - further means for combining each of said other parallel data streams with said first randomized channel signal after discrete synchronous delay intervals to form additional randomized channel signals.

2. A data randomizer as set forth in claim 1 in which said generating means comprises
   - a multistage shift register,
   - an exclusive-OR gate having at least two inputs and an output,
   - means for connecting at least two preselected stages of said shift register to the inputs of said exclusive-OR gate, and
   - means for feeding back signals from the output of said exclusive-OR gate to said multistage shift register.

3. A data randomizer as set forth in claim 1 in which said generating means comprises
   - a plurality of multistage shift registers connected in tandem through a plurality of first exclusive-OR gates,
   - each of said shift registers including a further exclusive-OR gate in feedback relationship between at least two preselected stages thereof and one of said first exclusive-OR gates.

4. A data randomizer as set forth in claim 2 in which each of said further combining means comprises
   - an exclusive-OR gate having two inputs and an output,
   - one input and one output being connected in series with each of said other parallel data streams and said other input being connected to a preselected stage of said shift register.

5. A digital data derandomizer for randomized parallel streams of binary data comprising
   - means responsive to one of said parallel data streams for regenerating a long-period random key signal,
   - means at the input of said regenerating means for combining said one parallel data stream with said key signal to form a first derandomized data stream, and
   - further means for combining each of said other parallel data streams with said first derandomized data stream after discrete synchronous delay intervals to form additional derandomized data streams.

6. A data derandomizer as set forth in claim 5 in which said regenerating means comprises
   - a multistage shift register,
   - an exclusive-OR gate having at least two inputs and an output,
   - means for connecting at least two preselected stages of said shift register to the inputs of said exclusive-OR gate, and
   - means for feeding back signals from the output of said exclusive-OR gate to said multistage shift register.

7. A data derandomizer as set forth in claim 5 in which said regenerating means comprises
   - a plurality of multistage shift registers connected in tandem through a plurality of first exclusive-OR gates,
   - each of said shift registers including a further exclusive-OR gate in feedback relationship between at least two preselected stages thereof and one of said first exclusive-OR gates.

8. A data derandomizer as set forth in claim 6 in which each of said further combining means comprises
   - an exclusive-OR gate having two inputs and an output,
   - one input and one output being connected in series with each of said other parallel data streams and said other input being connected to a preselected stage of said shift register.

9. In combination with a synchronous digital data transmission system in which parallel streams of data are employed and including a transmitting terminal, a transmission channel and a receiving terminal:
   - at said transmitting terminal including means for applying modulated signals to said channel,
   - a data scrambler comprising
     - means responsive to one of said parallel data streams for generating a long-period pseudorandom key signal and combining said key signal with said one parallel data stream to form a first scrambled data stream, and means for joining each of said other parallel data streams with said first scrambled data stream after discrete synchronous delay intervals to form additional scrambled data streams;

at said receiving terminal including means for demodulating signals from said channel, a data descrambler comprising means responsive to the one demodulated data stream corresponding to said first scrambled data stream for regenerating said long-period pseudorandom key signal and combining said key signal with said one demodulated data stream to form a first descrambled data stream, and means for joining each of the demodulated data streams corresponding to said additional scrambled data stream after discrete synchronous delay intervals to form additional descrambled data streams.

10. The combination defined by claim 9 in which the generating means at said transmitting terminal comprises at least one multistage shift register including an exclusive-OR gate in feedback relationship with at least two stages and the input thereof, and said joining means comprise exclusive-OR gates; and in which the regenerating means at said receiving terminal comprises at least one multistage shift register complementary to the multistage shift register at said transmitting terminal and including an exclusive-OR gate in identical feedback relationship with at least two stages and the input thereof, and said joining means thereat comprise exclusive-OR gates.

* * * * *